(12) United States Patent
Burr

(10) Patent No.: US 7,792,070 B1
(45) Date of Patent: Sep. 7, 2010

(54) MULTI-BEAM SATELLITE NETWORK TO MAXIMIZE BANDWIDTH UTILIZATION

(76) Inventor: Douglas Burr, 5844 Terrazzo Ct., San Jose, CA (US) 95123

( * ) Notice: Subject to any disclaimer, the term of this patent is extended or adjusted under 35 U.S.C. 154(b) by 669 days.

(21) Appl. No.: 11/891,086

(22) Filed: Aug. 8, 2007

Related U.S. Application Data

(60) Provisional application No. 60/923,263, filed on Apr. 13, 2007.

(51) Int. Cl.
*H04B 7/185* (2006.01)
(52) U.S. Cl. .................................. 370/316; 455/427
(58) Field of Classification Search ............... None
See application file for complete search history.

(56) References Cited

U.S. PATENT DOCUMENTS

| | | | |
|---|---|---|---|
| 5,408,237 A | 4/1995 | Patterson et al. | |
| 5,448,621 A | 9/1995 | Knudsen | |
| 5,574,968 A | 11/1996 | Olds et al. | |
| 5,574,969 A | 11/1996 | Olds et al. | |
| 5,613,194 A | 3/1997 | Olds et al. | |
| 5,826,190 A | 10/1998 | Krutz et al. | |
| 6,314,269 B1 | 11/2001 | Hart et al. | |
| 6,466,569 B1 | 10/2002 | Wright et al. | |
| 6,725,013 B1 | 4/2004 | Chang et al. | |
| 6,788,917 B1 | 9/2004 | Refai et al. | |
| 6,892,068 B2 | 5/2005 | Karabinis et al. | |
| 6,944,450 B2 | 9/2005 | Cox | |
| 7,149,526 B2 | 12/2006 | Karabinis et al. | |
| 7,177,592 B2 | 2/2007 | Jarett | |
| 7,200,360 B1 | 4/2007 | Chang et al. | |
| 2002/0013149 A1 | 1/2002 | Threadgill et al. | |
| 2003/0054814 A1 | 3/2003 | Karabinis et al. | |
| 2003/0073436 A1 | 4/2003 | Karabinis et al. | |
| 2004/0023658 A1 | 2/2004 | Karabinis et al. | |
| 2004/0072561 A1 | 4/2004 | LaPrade | |
| 2005/0118947 A1 | 6/2005 | Ames et al. | |
| 2005/0164701 A1 | 7/2005 | Karabinis et al. | |
| 2005/0181786 A1 | 8/2005 | Karabinis et al. | |
| 2005/0272369 A1 | 12/2005 | Karabinis et al. | |
| 2005/0282542 A1 | 12/2005 | Karabinis | |
| 2007/0026867 A1 | 2/2007 | Karabinis | |
| 2008/0146145 A1* | 6/2008 | Pateros et al. ............ | 455/12.1 |
| 2009/0081946 A1* | 3/2009 | Dankberg et al. ......... | 455/3.02 |
| 2009/0286467 A1* | 11/2009 | Miller ..................... | 455/3.02 |
| 2009/0290530 A1* | 11/2009 | Dankberg et al. ......... | 370/316 |
| 2009/0291633 A1* | 11/2009 | Dankberg et al. ......... | 455/12.1 |
| 2009/0295628 A1* | 12/2009 | Wilson et al. ............ | 342/356 |

* cited by examiner

*Primary Examiner*—Anh-Vu Ly
(74) *Attorney, Agent, or Firm*—Weaver Austin Villeneuve & Sampson LLP

(57) ABSTRACT

A communications network (100) for maximizing bandwidth utilization. An embodiment of the invention comprises a spacecraft (11), at least one gateway (12) communicatively coupled to the spacecraft (11) by a feeder link (13) operating within at least one selected frequency band within a bandwidth, at least one user terminal (16) communicatively coupled to the spacecraft (11) by a user link (17), the user link (17) operable at any frequency band within the bandwidth without regard to polarization; and, the communications network (100) adapted to provide for simultaneous operation of at least a portion of the feeder link (13) and a portion of the user link (17) at a common polarization and frequency band within the bandwidth.

10 Claims, 6 Drawing Sheets

MULTI-BEAM SATELLITE NETWORK TO MAXIMIZE BANDWIDTH UTILIZATION

CROSS REFERENCES TO RELATED APPLICATION

This patent application claims the priority benefit of U.S. provisional patent application 60/923,263 filed on Apr. 13, 2007, and entitled "Multi-Beam Satellite Network to Maximize Bandwidth Utilization", which provisional patent application is hereby incorporated by reference in its entirety into the present patent application.

TECHNICAL FIELD

This invention pertains to the field of satellite communications networks, and more particularly to the provision of broadband communications services via a multi-beam satellite system that efficiently utilizes allocated bandwidth.

BACKGROUND OF THE INVENTION

The assignee of the present invention manufactures and deploys communications spacecraft. Such spacecraft operate within a regulatory regime that licenses at least one operating frequency bandwidth for a particular spacecraft communications service and specifies, inter alia, the maximum signal power spectral density (PSD) of communications signals radiated to the ground. A growing market exists for provision of high data rate communication services to individual consumers and small businesses which may be underserved by or unable to afford conventional terrestrial services. To advantageously provide high data rate communication services to such users, the spacecraft must (1) provide a high PSD so as to enable the use of low cost user terminals, and (2) efficiently use the licensed bandwidth so as to maximize the communications throughput for a particular licensed bandwidth.

A typical satellite communications network 100 is illustrated in simplified form in FIG. 1. The system includes a satellite 11, typically though not necessarily located at a geostationary orbital location defined by a longitude. Satellite 11 is communicatively coupled to at least one gateway 12 and to a plurality of user terminals 16. The user terminals 16 comprise satellite terminals that may be handheld mobile telephones or car phones, or may be embedded, for example, in laptop or desktop personal computers, set top boxes or phone booths.

Each gateway 12 and the satellite 11 communicate over a feeder link 13, which has both a forward uplink 14 and a return downlink 15. Each user terminal 16 and the satellite 11 communicate over a user link 17 that has both a forward downlink 18 and a return uplink 19. A spacecraft antenna subsystem may provide an antenna beam pattern wherein an entire service region is covered using the available bandwidth a single time. Advantageously, however, multiple satellite antenna beams (or cells) are provided, each of which can serve a substantially distinct cell within an overall service region.

Dividing the overall service region into a plurality of smaller cells permits frequency reuse, thereby substantially increasing the bandwidth utilization efficiency. Although frequency reuse in this manner is known (see, for example, Ames, et al., U.S. patent application Ser. No. 10/940,356), systems like the one described in Ames require that a total bandwidth allocated to the downlink be divided into separate non-overlapping blocks for the forward downlink 18 and the return downlink 15. Similarly, prior art solutions divide the total bandwidth allocated to the uplink into separate non-overlapping blocks for the forward uplink 14 and the return uplink 19.

DISCLOSURE OF INVENTION

A communications network (100) for maximizing bandwidth utilization. An embodiment of the invention comprises a spacecraft (11), at least one gateway (12) communicatively coupled to the spacecraft (11) by a feeder link (13) operating within at least one selected frequency band within a bandwidth, at least one user terminal (16) communicatively coupled to the spacecraft (11) by a user link (17), the user link (17) operable at any frequency band within the bandwidth without regard to polarization; and, the communications network (100) adapted to provide for simultaneous operation of at least a portion of the feeder link (13) and a portion of the user link (17) at a common polarization and frequency band within the bandwidth.

BRIEF DESCRIPTION OF THE DRAWINGS

Features of the invention are more fully disclosed in the following detailed description of the preferred embodiments, reference being had to the accompanying drawings, in which.

Figure 1:
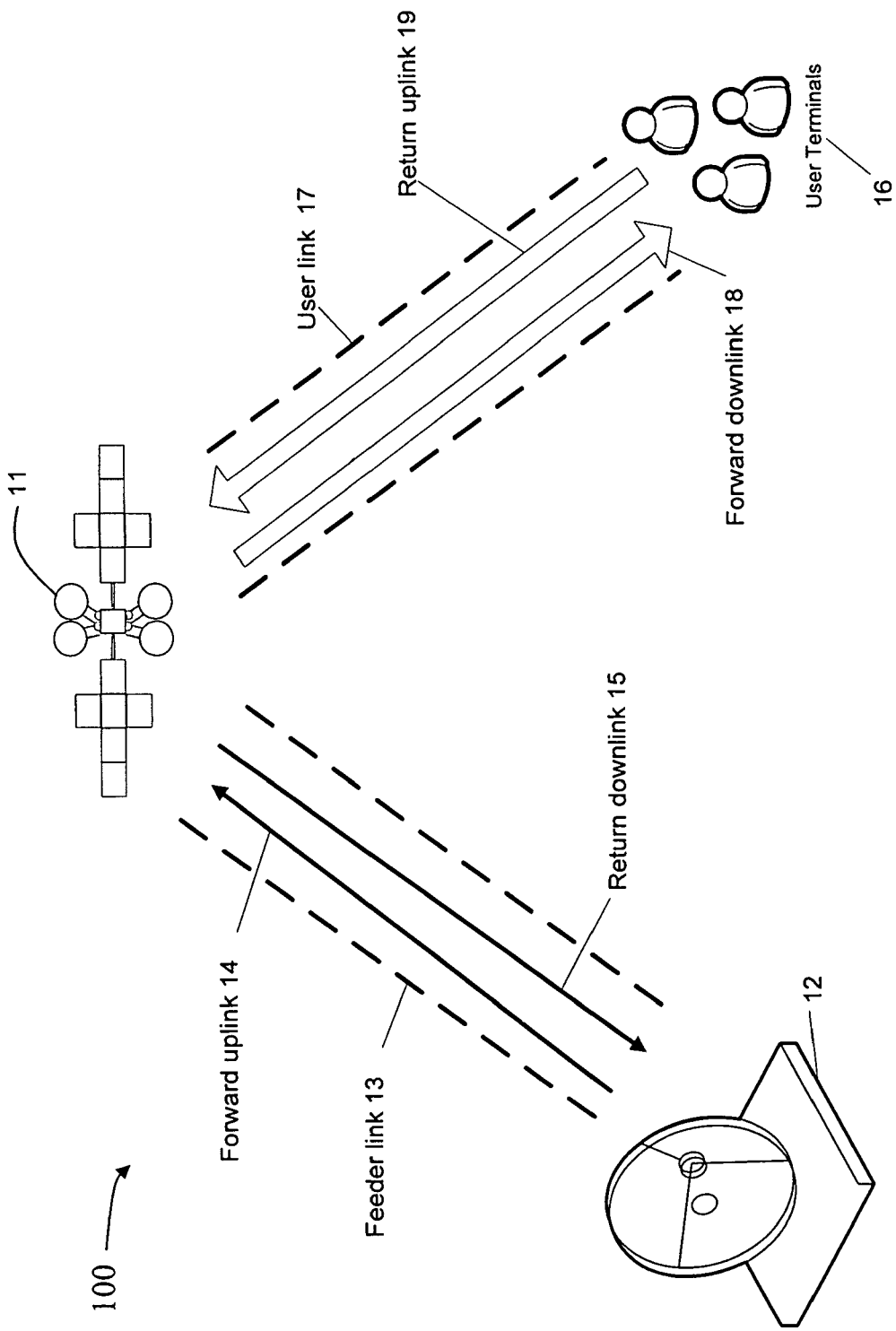
FIG. 1 is a system level diagram of an exemplary communications network of the prior art.

Throughout the drawings, the same reference numerals and characters, unless otherwise stated, are used to denote like features, elements, components, or portions of the illustrated embodiments. Moreover, while the subject invention will now be described in detail with reference to the drawings, it is done so in connection with the illustrative embodiments. It is intended that changes and modifications can be made to the described embodiments without departing from the true scope and spirit of the subject invention as defined by the appended claims.

DETAILED DESCRIPTION OF THE PREFERRED EMBODIMENTS

Specific exemplary embodiments of the invention will now be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "connected" or "coupled" to another element, it can be directly connected or coupled to the other element, or intervening elements may be present. Furthermore, "connected" or "coupled" as used herein may include wirelessly connected or coupled.

The overall design and operation of spacecraft communications networks are well known to those having skill in the art, and need not be described further herein. As disclosed herein, a user terminal 16 is adapted for communication with a satellite 11, and may be one of a plurality of different types of fixed and mobile user terminals including, but not limited to, a cellular telephone, wireless handset, a wireless modem, a data transceiver, a paging or position determination receiver, or mobile radio-telephones. Furthermore, a user terminal may be hand-held, portable as in vehicle-mounted (including for example cars, trucks, boats, trains, and planes), or fixed, as desired. A user terminal may be referred to as a wireless communication device, a mobile station, a mobile unit, a subscriber unit, a mobile radio or radiotelephone, a wireless unit, or simply as a "user," a "subscriber," or a "mobile" in some communication systems. Furthermore, as used herein, the term "spacecraft" includes one or more satellites at any orbit (geostationary, substantially geostationary, inclined geosynchronous, Molniya, medium earth orbit, low earth orbit, and other non-geostationary orbits) and/or one or more other spacecraft that has/have a trajectory above the earth or other celestial body at any altitude.

It will be understood that although the terms "first" and "second" are used herein to describe various elements, these elements should not be limited by these terms. These terms are used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

FIG. 1 shows an exemplary spacecraft communications network 100, comprising a spacecraft 11 communicatively coupled to at least one gateway 12 and a plurality of user terminals 16. Feeder link 13 consists of forward uplink 14 and return downlink 15. User link 17 consists of forward downlink 18 and return uplink 19. There may be several gateways 12 communicatively coupled to spacecraft 11, and a large number of user terminals 16. Each gateway 12 is advantageously located proximate to an Internet backbone (not shown) and has a high data rate connection therewith.

A conventional multi-beam spacecraft 11 has an antenna subsystem for providing a grid of antenna spot beams. The shape of the grid in turn defines a service region. The grid of individual spot beams (user beams) divides an overall service region, which may, for example, coincide with the territory of the United States, into a number of smaller cells. For example, U.S. patent application Ser. No. 11/467,490, assigned to the assignee of the present invention, describes a pattern of 135 spot beams covering the continental United States (CONUS), Hawaii, Alaska, and Puerto Rico.

Conventional systems locate gateway(s) 12 within the service region. To avoid interference between user link signals 17 and feeder link 13 signals, known systems such as the system described by Ames, et al., U.S. patent application Ser. No. 10/940,356, require that the total bandwidth allocated to the downlink be divided into separate non-overlapping blocks for the forward downlink 18 and the return downlink 15. Similarly, the total bandwidth allocated to the uplink is divided into separate non-overlapping blocks for the forward uplink 14 and the return uplink 19. This approach substantially reduces the amount of bandwidth available to the user link 17, since any bandwidth allocated to the feeder link 13 is bandwidth that cannot be allocated to the user link 17. As a result, the bandwidth utilization efficiency for such systems is less than optimal.

In an embodiment of the present invention, a spacecraft communications network 100, having been licensed to operate within a certain amount of total frequency bandwidth, is enabled to allocate the entire licensed bandwidth to the user link 17. Some or all of the total licensed bandwidth is reused by the gateway(s) 12, thereby providing for simultaneous operation of at least a portion of the feeder link 13 and a portion of the user link 17 at common frequencies. More specifically, the present invention enables forward uplink 14 and return uplink 19 to reuse the same frequency. Similarly, the present invention enables forward downlink 18 and return downlink 15 to reuse the same frequency. Simultaneous operation of the feeder link 13 and the user link 17 at common frequencies means that the gateway(s) 12 may reuse any part of the total bandwidth allocated to the user antenna beams. This may be accomplished in various ways, as discussed hereinafter.

Figure 2:
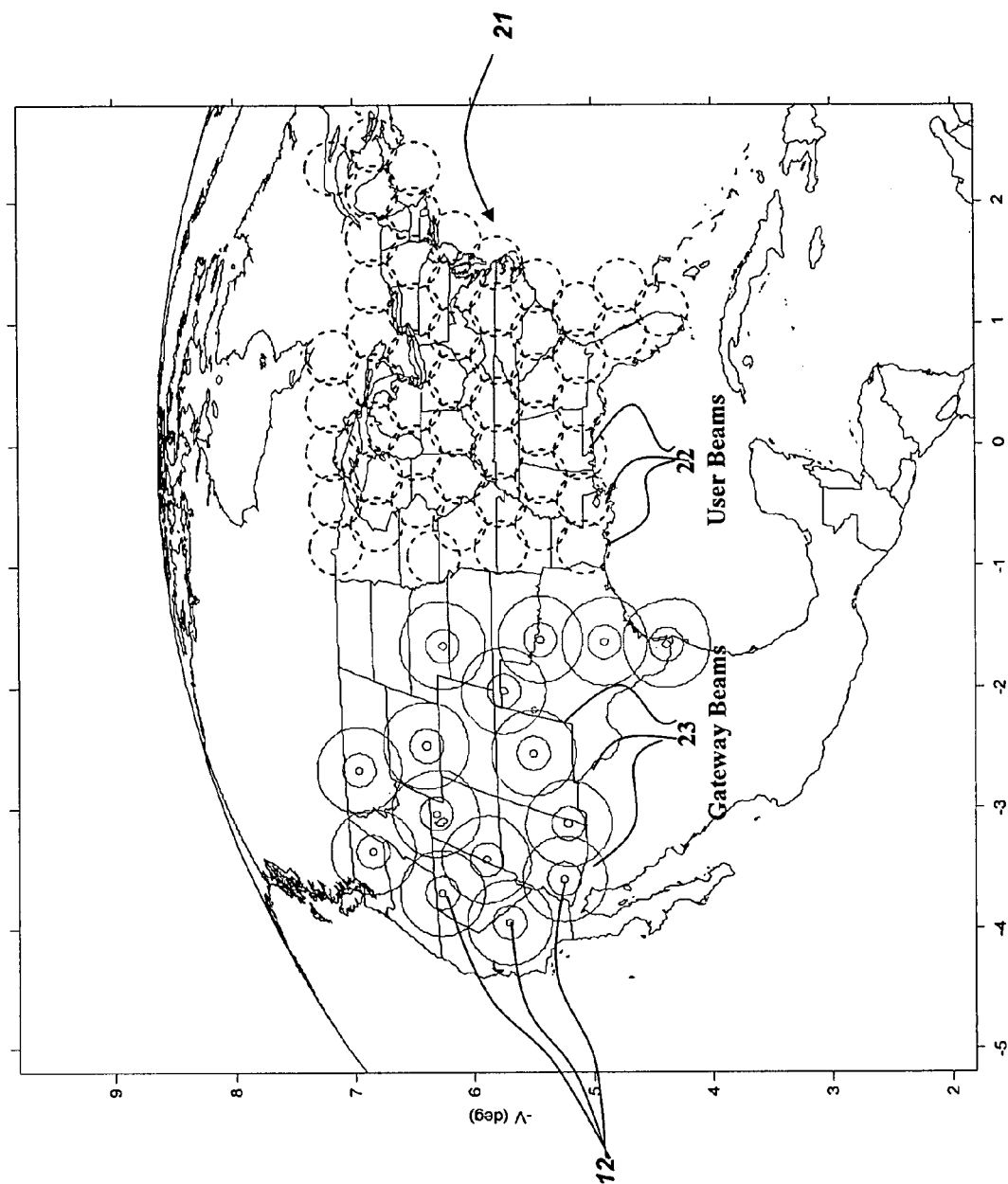
FIG. 2 is an exemplary map of gateway locations and user beams as provided by one embodiment of the present invention.

One embodiment of the present invention results in the antenna coverage pattern shown in FIG. 2, and provides for spatial separation between the gateway(s) 12 and a service region 21 to enable non-interfering use of the same frequency by the gateway(s) 12 and user terminals 16. As shown in FIG. 2, the service region 21 is defined as the footprint made by a plurality of user beams 22, and encompasses roughly the eastern half of the continental United States. In this example, a user terminal 16, located within the footprint of any of fifty three user beams 22, may be communicatively coupled over user link 17 to spacecraft 11, and spacecraft 11 may be communicatively coupled over feeder link 13 to at least one of fifteen gateways 12. Each gateway 12 is located in a gateway beam 23 and is coupled to the public switched telephone network. Preferably each gateway 12 is proximate to, and communicatively coupled with, a high speed Internet backbone access point. Each gateway beam 23 is substantially spatially isolated from the service region 21. Because of this spatial isolation, the user link 17 advantageously is operable at the same frequency(ies) as the feeder link 13. Moreover, in accordance with the present invention, the frequency band common to both the feeder link 13 and the user link 17 may encompass substantially all of the bandwidth licensed to the network 100.

In a presently preferred embodiment, the antenna coverage pattern of FIG. 2 is provided by means of a geostationary satellite 11 with a payload DC power capability of approximately 14 kW, providing fixed satellite service at Ka-band. A satellite 11 having this approximate payload power capacity can deliver the maximum permitted power spectral density (PSD) to service region 21 or to other, similarly sized service regions. Thus, the dual objectives of simultaneously maximizing PSD and bandwidth utilization efficiency may be achieved.

The antenna pattern coverage of FIG. 2 may be varied substantially while remaining within the scope of the invention. For example, user beams 22 may define a service region encompassing a western portion of the United States, in which case the gateway(s) 16 is (are) located in an eastern portion of the United States, spatially isolated from the service region. Moreover, the invention may be advantageously employed in connection with other geographic service regions besides the United States.

Figure 3:
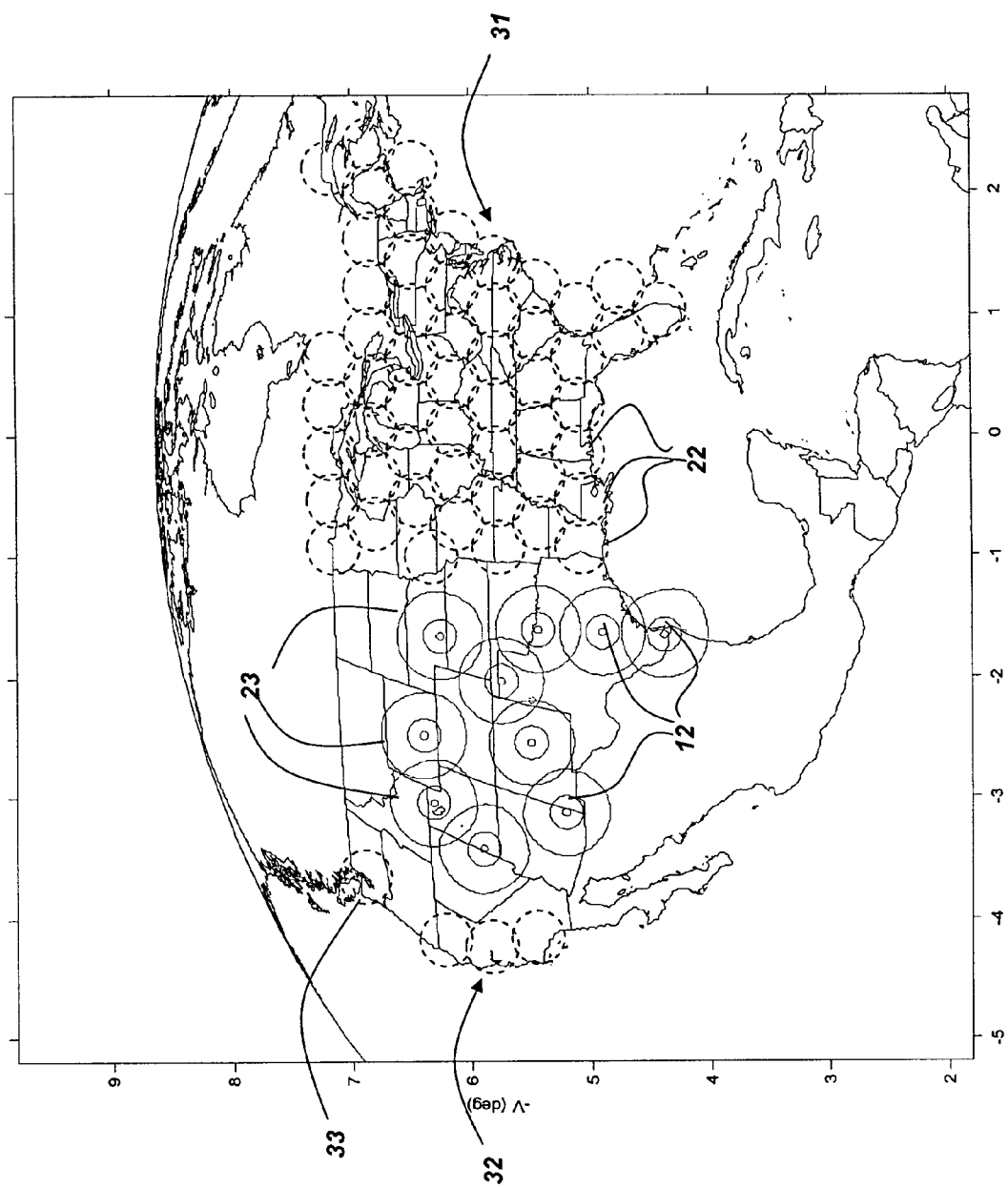
FIG. 3 is an exemplary map of gateway locations and user beams as provided by a further embodiment of the present invention.

Another embodiment of the invention results in the antenna pattern coverage illustrated in FIG. 3, which shows that the user beams 22 may be distributed across non-contiguous service regions. For example, as illustrated in FIG. 3, a first service region 31, defined by fifty three user beams, is disposed to coincide with roughly the eastern half of the United States, and a second and a third service region 32 and 33, defined, respectively, by three user beams 22 and one user beam 22, are disposed along the western seaboard of the United States. In this example, a user terminal 16, located within the footprint of any of fifty seven user beams 22, may be communicatively coupled over user link 17 to spacecraft 11, and spacecraft 11 may be communicatively coupled over feeder link 13 to at least one of ten gateways 12. Each gateway 12 is located within the footprint of a gateway beam 23. Each gateway beam 23 is substantially spatially isolated from each service region 31, 32 and 33. Because of this spatial isolation, the user link 17 advantageously is operable at the same frequency(ies) as the feeder link 13. Moreover, in accordance with the present invention, the frequency band common to both the feeder link 13 and the user link 17 may encompass substantially all of the bandwidth licensed to the network 100.

Spatial separation between gateway beams 23 is advantageously provided to enable use of the entire bandwidth by each gateway 12. Furthermore, the gateway(s) 12 is (are) preferably disposed geographically to be proximate to the terrestrial Internet backbone (not shown) and coupled to that backbone by broadband communications links (not shown).

Figure 3A:
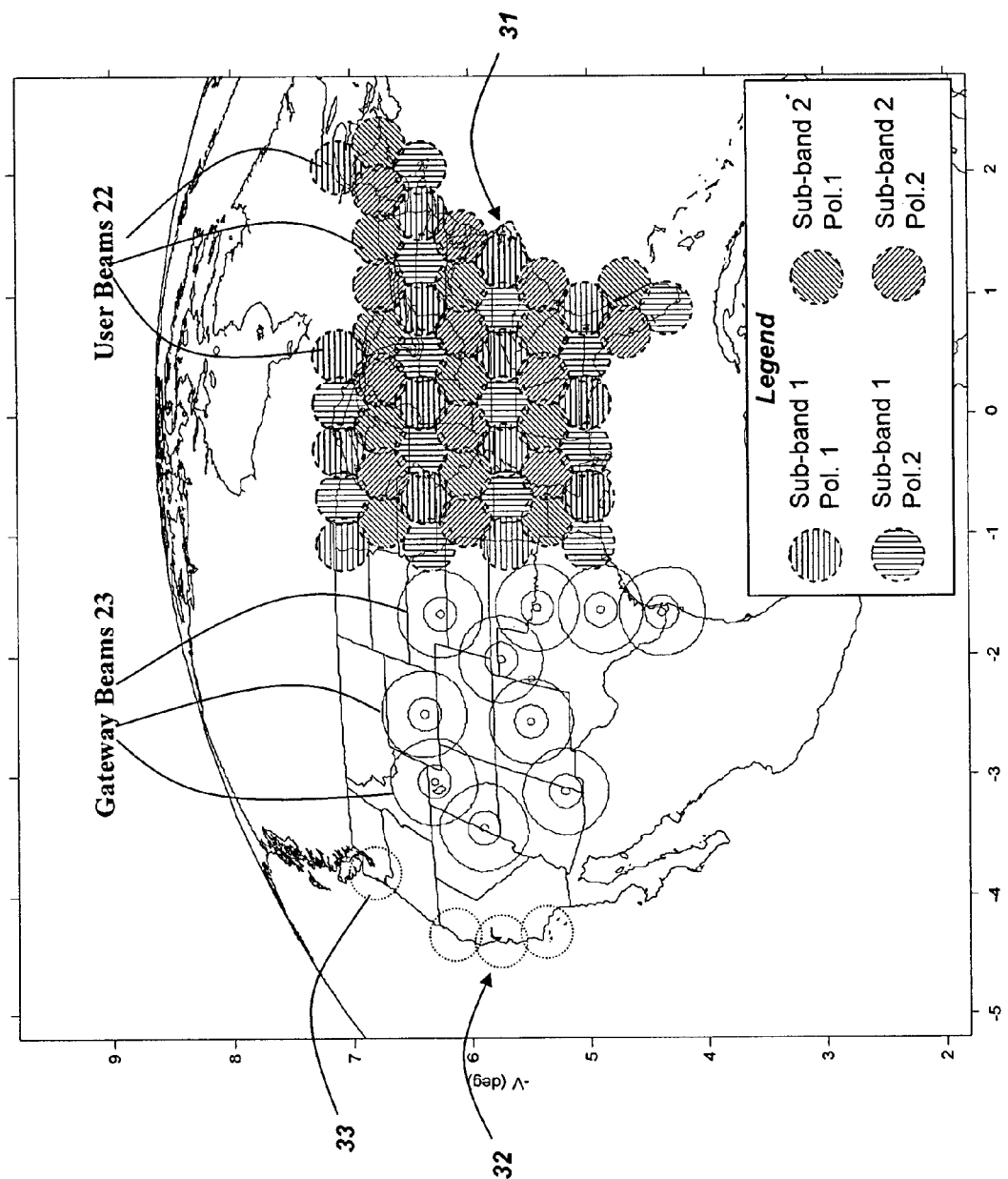
FIG. 3A is an exemplary map of gateway locations and user beams in an embodiment of the invention, illustrating a frequency re-use scheme.

As previously discussed, a service region (for example, service region 21) may be defined by a grid of individual user beams 22. Frequency reuse by two or more user beams 22 may be employed in various embodiments of the present invention. For example, any two user beams may employ the same frequency without regard to antenna polarization provided that the two user beams are spatially isolated (i.e., not adjacent or overlapping). Furthermore, even adjacent user beams may employ a common frequency provided that each adjacent user beam operates at a different antenna polarization. Frequency re-use within a plurality of user beams 22 may be improved by using, for example, a "four color" re-use plan. As illustrated in FIG. 3A, in a four color re-use plan, each color represents a combination of a frequency sub-band and an antenna polarization. Appropriate assignment of colors to user beams 22 provides that no two adjacent user beams share both a common frequency and a common polarization.

Figure 1A:
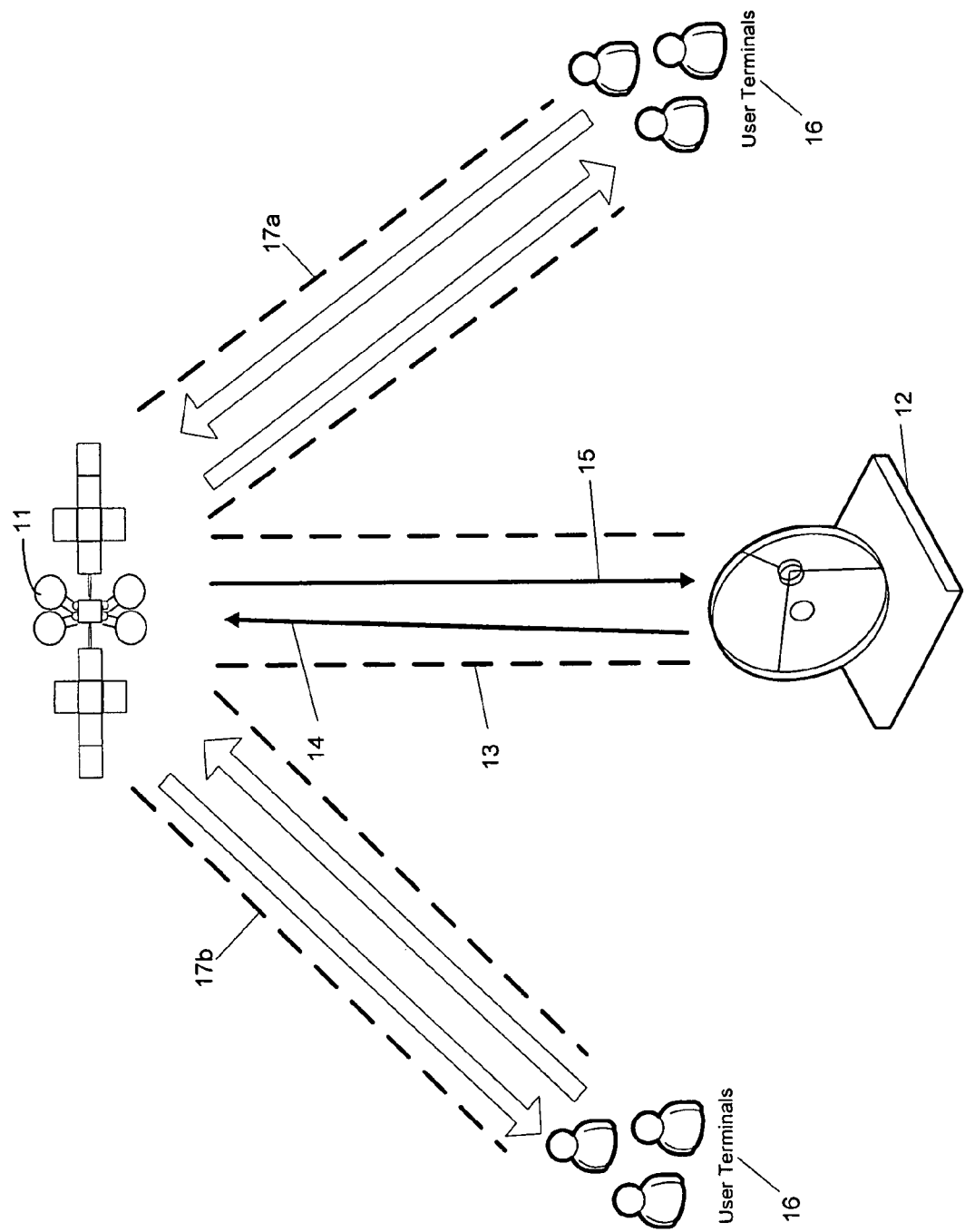
FIG. 1A is a system level diagram of an embodiment of a communications network of the present invention.
Figure 4:
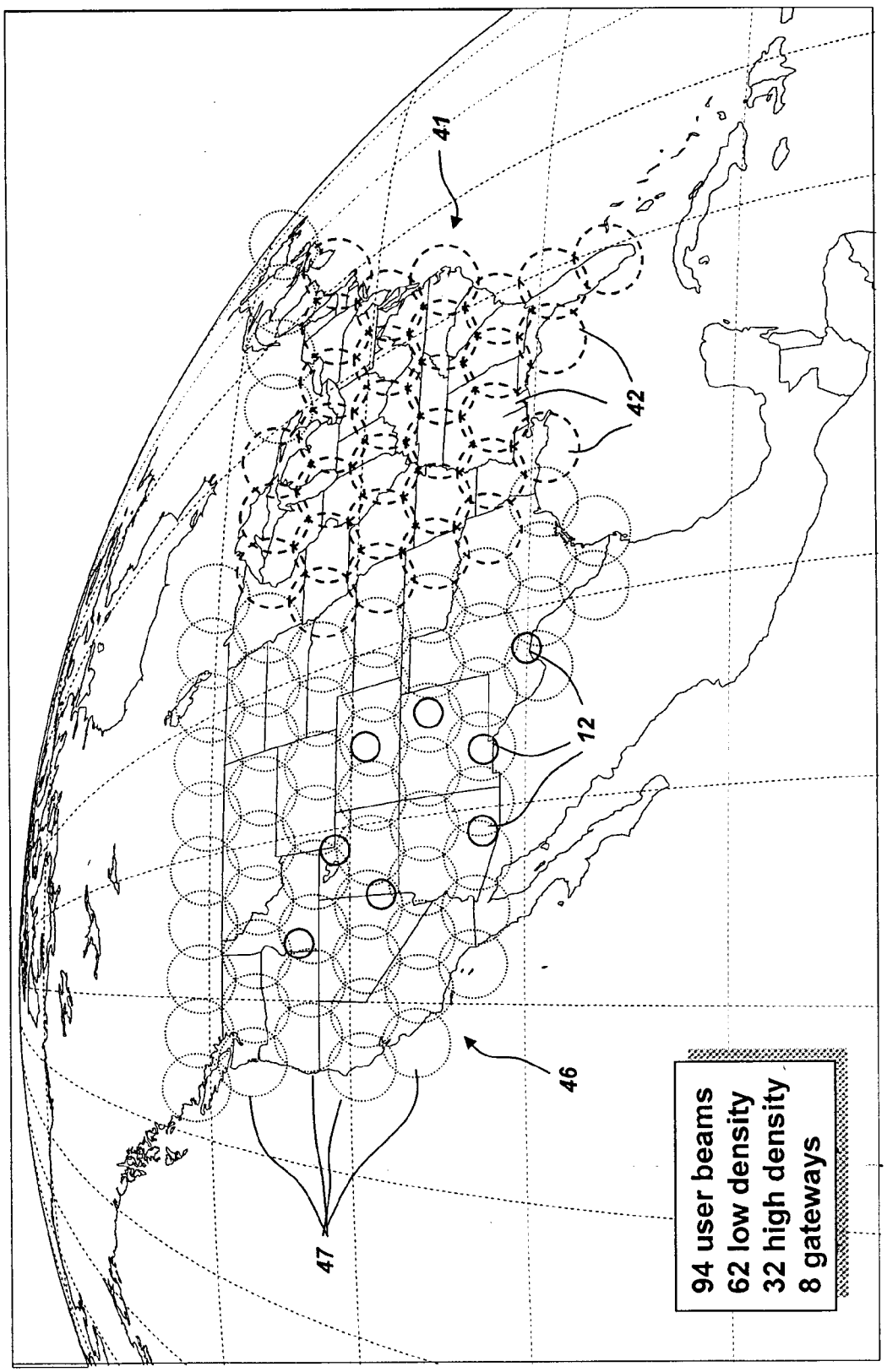
FIG. 4 is an exemplary map of gateway locations and user beams as provided by a further embodiment of the present invention.

A further embodiment of the invention, illustrated in FIG. 1A, may provide the antenna pattern coverage illustrated in FIG. 4, in which a subset of user beams, termed low density user beams 47, are distributed so as to define a service region 46 wherein one or more gateways 12 are also disposed. In this embodiment of the invention, the available spectrum is allocated into, for example, two non-overlapping unequally sized segments. The larger of the two spectrum segments is assigned to a first user link 17a and the smaller of the two spectrum segments is assigned to a second user link 17b. The feeder link 13 preferably operates within the same spectrum segment as user link 17a and outside the spectrum segment assigned to user link 17b.

As illustrated in FIG. 4, a first service region 41 is defined by a plurality of high density user beams 42 and encompasses roughly the eastern half of the continental United States. In this example, a user terminal 16, which may be located in any of thirty-two user beams 42, is communicatively coupled over user link 17a to spacecraft 11, and spacecraft 11 may be communicatively coupled over feeder link 13 to at least one of eight gateways 12. Each gateway 12 is substantially spatially isolated from the first service region 41. Because of this spatial isolation, the user link 17a advantageously is operable at the same frequency(ies) as the feeder link 13. Moreover, in accordance with the present invention, the frequency band common to both the feeder link 13 and the user link 17a may encompass the entirety of the bandwidth or an arbitrarily large fraction of the bandwidth licensed to the network 100.

As further illustrated in FIG. 4, a second service region 46 is defined by a plurality of low density user beams 47 and encompasses roughly the western half of the continental United States. At least one gateway 12 is also disposed in second service region 46. In this example, a user terminal 16, which may be located in any of sixty-two low density user beams 47, is communicatively coupled over user link 17b to spacecraft 11, and spacecraft 11 is communicatively coupled over feeder link 13 to at least one of eight gateways 12. Because the feeder link 13 operates outside the spectrum segment assigned to user link 17b, spatial separation between any gateway 12 and user beam 47 is not required to avoid interference.

Of course, the methods of optimizing frequency reuse by two or more user beams discussed above may also be employed in this embodiment of the present invention. For example, any two user beams may employ the same frequency without regard to antenna polarization provided that the two user beams are spatially isolated (i.e., not adjacent or overlapping). Furthermore, even adjacent user beams may employ a common frequency provided that each adjacent user beam operates at a different antenna polarization. Frequency re-use within a plurality of user beams may be improved by using, as discussed above, a "four color" re-use plan.

The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A communications network, comprising:
    a spacecraft;
    at least one gateway communicatively coupled to the spacecraft by a feeder link operating within at least one selected first sub-band of frequencies within a bandwidth;
    a first user terminal communicatively coupled to the spacecraft by a first user link, said first user link operable at any frequency band within said first sub-band;
    a second user terminal communicatively coupled to the spacecraft by a second user link, said second user link operable at any frequency band within a second sub-band of frequencies within the bandwidth, said second sub-band having no frequency in common with the first sub-band, wherein the communications network is adapted to provide for simultaneous operation of at least a portion of the feeder link and at least a portion of the first user link at a common polarization and frequency within the bandwidth; and
    an antenna subsystem disposed on the spacecraft, said antenna subsystem providing a first antenna beam pattern associated with the first user link, and a second antenna beam pattern associated with the second user link, said first and second antenna beam patterns defining respective first and second service regions, wherein every gateway is located within the second service region.

2. The communications network of claim 1, wherein at least a portion of the first user link operates at a common polarization and frequency as at least a portion of the feeder link.

3. The communications network of claim 1, wherein the first and second sub-band together encompass substantially all of the bandwidth.

4. The communications network of claim 1, wherein at least one gateway is located proximate to and communicatively coupled with an Internet backbone.

5. The communications network of claim 1, wherein the spacecraft is a satellite operable in geostationary orbit.

6. The communications network of claim 1, wherein the spacecraft is a satellite operable in non-geostationary orbit.

7. The communications network of claim 1, wherein the user links and the feeder link are operable at Ka band.

8. The communications network of claim 1, wherein at least one antenna beam pattern is configured to provide a plurality of individual spot beams.

9. The communications network of claim 8, wherein at least one antenna beam pattern is configured to provide for frequency re-use in spatially isolated spot beams.

10. The communications network of claim 8, wherein frequency re-use is maximized according to a four color re-use plan wherein a color represents a combination of a frequency sub-band and an antenna polarization.

* * * * *